United States Patent [19]

Vogelsang

[11] Patent Number: 5,324,083
[45] Date of Patent: Jun. 28, 1994

[54] PIPE CONNECTION WITH SLEEVE, INSERT PART AND RETAINING RING

[75] Inventor: Horst Vogelsang, Herten/Westf., Fed. Rep. of Germany

[73] Assignee: Dipl.-Ing. Dr. Ernst Vogelsang GmbH & Co. KG, Herten/Westf., Fed. Rep. of Germany

[21] Appl. No.: 133,772

[22] Filed: Oct. 8, 1993

Related U.S. Application Data

[63] Continuation of Ser. No. 810,469, Dec. 19, 1991.

[51] Int. Cl.$^5$ ............................................. F16L 17/04
[52] U.S. Cl. .................... 285/110; 285/345; 285/379
[58] Field of Search ................ 285/110, 423, 345, 379

[56] References Cited

U.S. PATENT DOCUMENTS

| | | | |
|---|---|---|---|
| 3,857,589 | 12/1974 | Oostenbrink | 285/110 |
| 4,298,206 | 11/1981 | Kojima | 285/110 |
| 4,487,421 | 12/1984 | Housas et al. | 285/110 |
| 4,602,793 | 7/1986 | Andrick | 285/110 |
| 4,991,858 | 2/1991 | Abila et al. | 285/110 |

FOREIGN PATENT DOCUMENTS

| | | |
|---|---|---|
| 0283729 | 2/1988 | European Pat. Off. |
| 1182913 | 1/1964 | Fed. Rep. of Germany |
| 2453502 | 4/1976 | Fed. Rep. of Germany |
| 2528811 | 1/1977 | Fed. Rep. of Germany |
| 2800406 | 11/1983 | Fed. Rep. of Germany |
| 3644834 | 4/1988 | Fed. Rep. of Germany |
| 2512917 | 3/1983 | France |

*Primary Examiner*—Eric K. Nicholson
*Attorney, Agent, or Firm*—Herbert Dubno; Andrew Wilford; Yuri Kateshou

[57] ABSTRACT

A pipe connection which the insertion piece fits into a sleeve and presses a retaining ring there against. The retaining ring has a compression rib and is constructed so as to be urged into a channel in the sleeve, The ring body is formed unitarily with a sealed lip and a closure lip and a compression-relieving groove opens axially in the direction of insertion and extends almost to but is spaced from a radial plane of the compression rib.

4 Claims, 4 Drawing Sheets

PIPE CONNECTION WITH SLEEVE, INSERT PART AND RETAINING RING

CROSS REFERENCE TO RELATED APPLICATION

This application is a continuation of copending application Ser. No. 07/810,469 filed 19 Dec. 1991.

FIELD OF THE INVENTION

My present invention relates to a pipe connection of the type in which a sleeve on one of two pipes to be connected, especially plastic pipes, receives an insert part on the other pipe and a retaining ring is provided within the sleeve to grip and seal against the insert part.

More particularly, the invention relates to a pipe connection of this kind in which the sleeve is formed with an axially inwardly opening channel receiving the retaining ring and in which lips can be provided for effecting the gripping and sealing action.

BACKGROUND OF THE INVENTION

A pipe connection of the male and female type is known in which the female part is in the form of a sleeve connected with or unitarily formed on one of the two pipes to be connected, while an insert, which is generally cylindrical and tubular, is formed on the other pipe to constitute the male member which is insertable into the sleeve.

The sleeve can be provided with an inlet guide member forming the mouth of the sleeve, a final guide part or member axially inwardly of the sleeve and an enlargement between the guide members which forms a receiving channel accommodating a retaining ring.

A sealing chamber can be provided between the final guide member and the channel to accommodate a sealing lip which, in the absence of the insert part, extends frustoconically inwardly from the body of the ring. The sealing lip may have a gripping or closure lip formed thereon which conically widens away from the funnel-shaped sealing lip, i.e. axially inwardly.

The inner surface of the retaining ring can be formed with a compression rib which can define a ramp inclined toward the inlet guide member so that it is engaged by the insert part and can be pressed outwardly upon such insertion to seat the ring body firmly in the channel.

A pipe connection of this type is described in the German Patent 28 00 408. Pipe connections and pipe systems with such connections are utilized, for example, as subterranean conduits, especially to form cable-protecting tubing or as cable-guide tubing.

The pipe connections can be described as two-phase pipe connections because the arrangement of the sleeve structure and the retaining ring has a dual function. Firstly, the compression rib of the retaining ring provides upon insertion of the insert part, an initial centering of the insert part. Thereafter the sealing lip with the closure or gripping lip formed thereon, provides a sealing and gripping action. The earlier system required a relatively high insertion force and thus significant insertion effort to overcome the resistance to insertion of the insert part provided by the ring which, although, composed of rubber and thus elastically deformable, is substantially incompressible.

Of course the absolute value of the force required to fit the parts together and hence the insertion effort will depend upon the Shore hardness of the rubber.

OBJECTS OF THE INVENTION

It is, therefore, the principal object of the present invention to provide a pipe connection of the type described which can function as indicated as a two-phase connection, but which will allow for a given Shore hardness of the rubber a reduced insertion force or insertion work, while nonetheless insuring proper centering and full sealing and gripping of the insertion part in the sleeve.

Another object of this invention is to provide a pipe connection which can be assembled more easily, especially for plastic pipe to be used as cable conduit, whereby drawbacks of the earlier system are avoided.

SUMMARY OF THE INVENTION

These objects and others which will become apparent hereinafter are attained in accordance with the invention in a pipe connection of the type described wherein the retaining ring is formed with an annular compression-relieving groove opening axially in a direction away from the mouth of the sleeve and hence in the direction of insertion of the insert part and which extends substantially to a region of the cross-section of the ring body at which the compression rib is provided but which terminates ahead of this cross-section. The region lying radially inwardly of the compression relieving groove is formed as an extension of the sealing lip running to the compression rib. The outer part defining the compression-relieving groove has its flank engaging the flank or inner side edge of the ring receiving channel in a stepless manner.

A compression-receiving groove is known in the context of a pipe connection (see German Open Application 24 53 502) but not in the context of the channel, ring, sealing lip and compression rib as described above. Generally, in accordance with the invention, the walls of the compression-relieving groove lie against one another continuously and it is important that the compression-relieving groove with its outer groove wall lie flush with the inner edge of the ring receiving channel so that the engagement of the inner wall of the groove with the wall of the sleeve is as much as possible free from steps or discontinuities.

More specifically, the pipe connection of the invention comprises:

a tubular insert member formed on one pipe to be connected to another pipe;

a sleeve formed on the other pipe and receiving the insert member, the sleeve comprising:

- a tubular insertion guide forming a mouth initially receiving the tubular insert member of the one pipe,
- a channel-forming part axially adjacent the tubular insertion guide and provided with an inwardly open annular channel defined between a relatively long annular flank on an axial side of the channel proximal to the mouth and a relatively short annular flank on an axial side of the channel turned away from the mouth,
- a recess-forming part axially adjacent the channel-forming part and provided with an inwardly open annular recess, and
- a tubular inner guide axially adjacent the recess-forming part; and a retaining ring mounted in the sleeve and engageable against the sleeve and the member for retaining the member in the sleeve and sealing between the insert member and the sleeve, the retaining ring comprising:

a ring body of trapezoidal cross section fitted into the channel, a sealing lip formed on the ring body and extending inwardly in a direction of insertion of the member into the sleeve, the sealing lip, prior to insertion of the member, being funnel shaped and converging inwardly in the direction, the sealing lip being deflected outwardly by the member upon insertion of the member into the sleeve to lie in the recess, a closure lip formed on the sealing lip and extending into the sleeve therefrom, the closure lip frustoconically widening away from the sealing lip prior to insertion of the member and engaging a wall of the recess, an annular compression rib projecting inwardly on the body and terminating a ramp surface of the body inclined inwardly and axially at least with respect to the tubular insertion guide and extending substantially to a flank of the body lying against the relatively long annular flank of the channel whereby, upon engagement of the member with the compression rib, the body is pressed into the channel, the compression rib lying axially inwardly of an axial center of the body and the channel, and an annular compression-relieving groove formed in the body and opening axially inwardly therein, the groove extending toward the mouth toward a region of the compression rib but terminating axially inwardly ahead of the rib.

The result is a pipe connection which has the described two-phase function. The compression rib presses the retaining rib into the receiving channel and the ring during insertion and under the effort of the insertion force and the compression insures a very precise positioning of the retaining ring in its channel and the insert part in the sleeve. The compression-relieving groove tends to reduce the insertion force. Surprisingly the sealing function is not reduced nor is the centering or positioning function threatened thereby. This is particularly significant since one would expect that, as resistance to insertion is reduced, there would be a reduction in both the sealing effect and the ability to maintain a precise position of the ring in its channel.

The sealing function has been found to benefit by providing the sealing lip or the closure or gripping lip with respective annular ribs engageable with the sleeve and with the insert part respectively.

The closure lip appears to effectively prevent contaminants from passing between the lips and the juxtaposed wall of the sleeve and from entering the compression-relieving groove.

According to a feature of the invention the compression-relieving groove terminates ahead of the cross-sectional region of the compression rib in a groove floor of arcuate cross section. Most advantageously, the compression relieving groove has a wedge-shaped cross-section converging towards that floor.

It has been found to be advantageous, moreover to form the sealing lips, including the closure lip, as a so called double lip in which individual lip parts are separated by a gap between them. The gap opens in the direction of insertion of the insert part but extends opposite to this direction substantially to the region at which the compression relieving groove begins. There is, therefore, a relationship between the compression relieving groove and the gap which has been found to be advantageous to the two-phase function.

Mention may be made of German Patent 3644834 which does disclose a double lip but in a different context.

BRIEF DESCRIPTION OF THE DRAWING

The above and other objects and advantages will become more readily apparent from the following description, reference being made to the accompanying drawing in which.

SPECIFIC DESCRIPTION

Figure 1A:
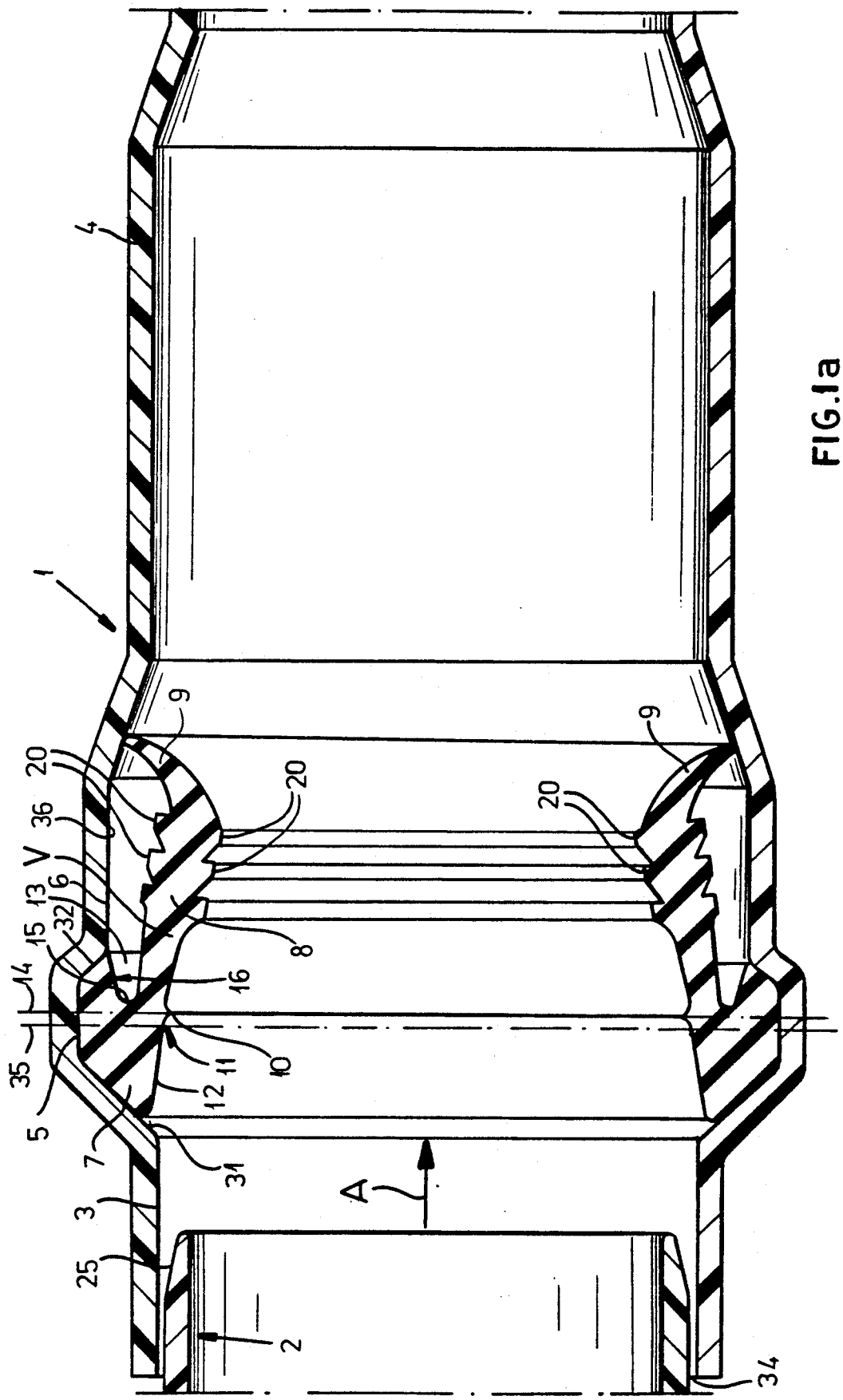
FIG. 1a is an axial cross-sectional view through the pipe connection prior to full insertion of the insert part in the sleeve.

The tube or pipe connection shown in the drawing comprises a sleeve 1 forming the female member and an insert part 2 forming the male member of the compression, each being provided integrally on a respective pipe to be connected to the other. For assembling of the system in long runs, one end of each pipe or cable conduit will be provided with the insert part while the opposite end of the same pipe will have the sleeve.

The sleeve 1 comprises a cylindrical tubular inlet guide member 3 and an end guide member (tubular inner guide) 4 separated by an enlargement 5,6 which forms a receiving channel 5 for a retaining ring 7 and a sealing chamber (recess forming part) 6 for a sealing lip 8 formed on the body of the retaining ring 7 and extending in a converging funnel shape inwardly in the direction A of insertion of the part 2 into the sleeve (see FIG. 1a)

Figure 2:
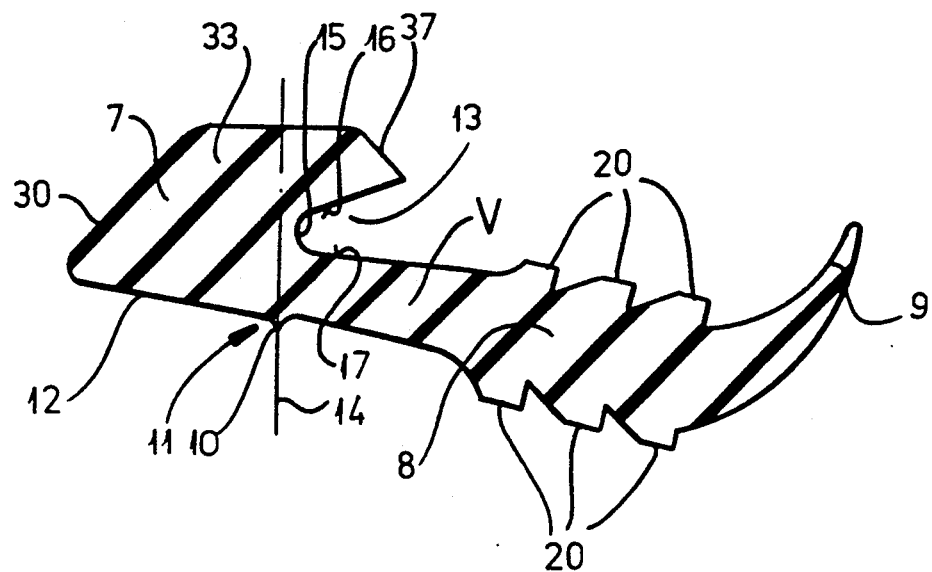
FIG. 2 is a detail section drawn to a larger scale through the retaining ring of the FIG. 1a and 1b, showing the ring body, the sealing lip and the closure lip.
Figure 3:
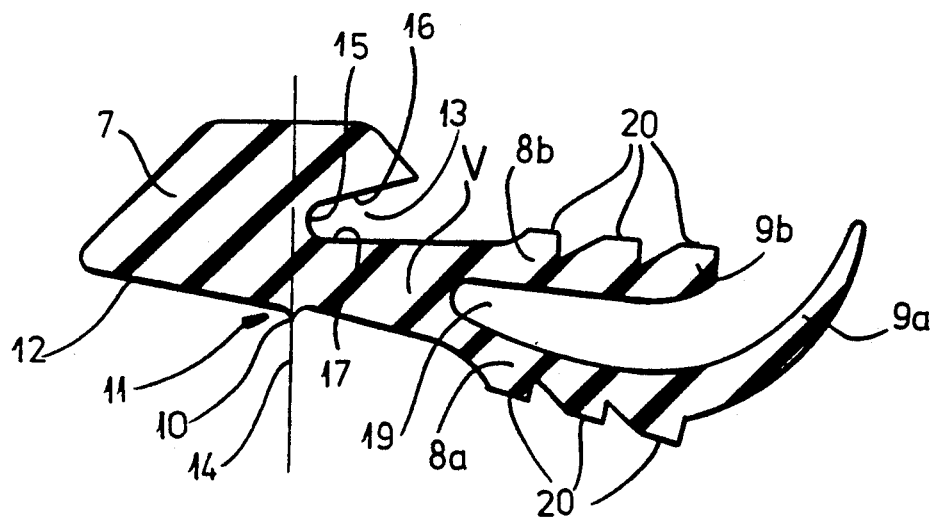
FIG. 3 is a view similar to FIG. 2 of an embodiment of the retaining ring in which the sealing lip is formed as a double lip.
Figure 4:
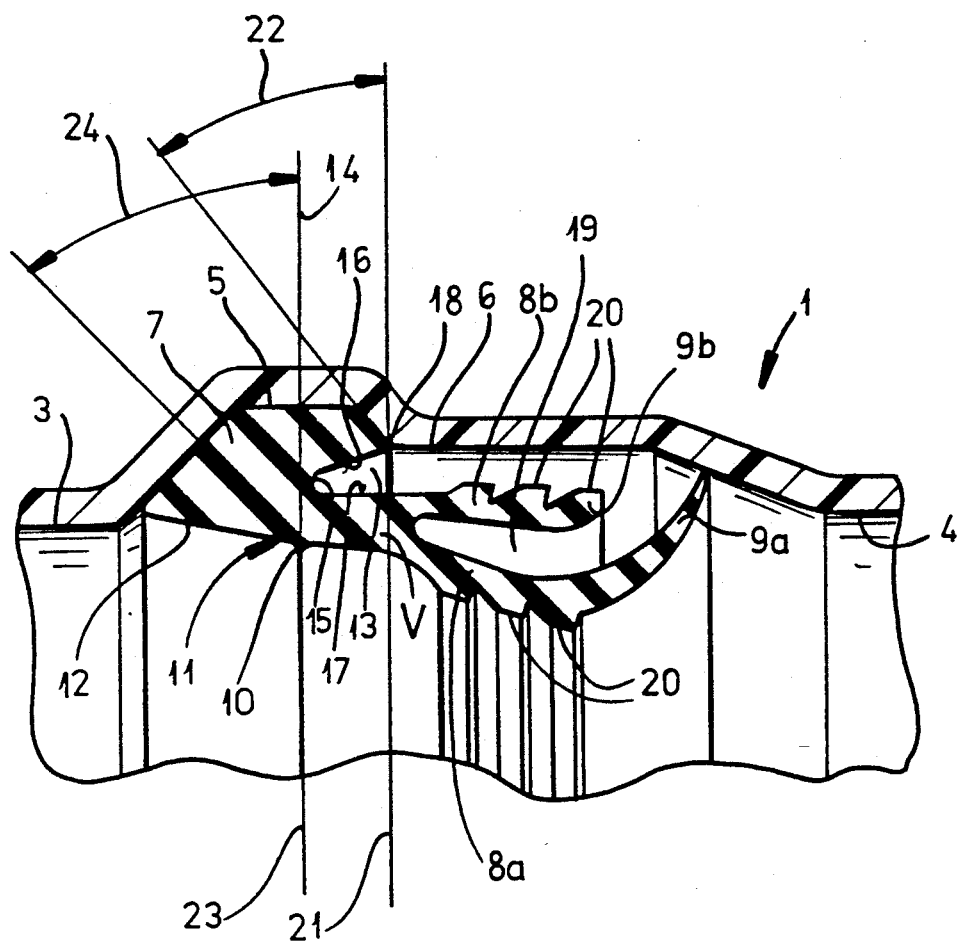
FIG. 4 is a cross-sectional view through the sleeve showing the ring of FIG. 3 in place.

The sealing lip is also formed unitarily with a closure lip 9 which bends outwardly in the axial direction A to conically widen in this direction so that this lip bears, even in the uncoupled state of the pipe members, upon the inner wall of the sealing chamber 6 to thereby prevent incursion of contaminants between the ring and the sleeve (see FIG. 1a and 2) FIGS. 3 and 4 show alternative embodiments of the ring.

Figure 1B:
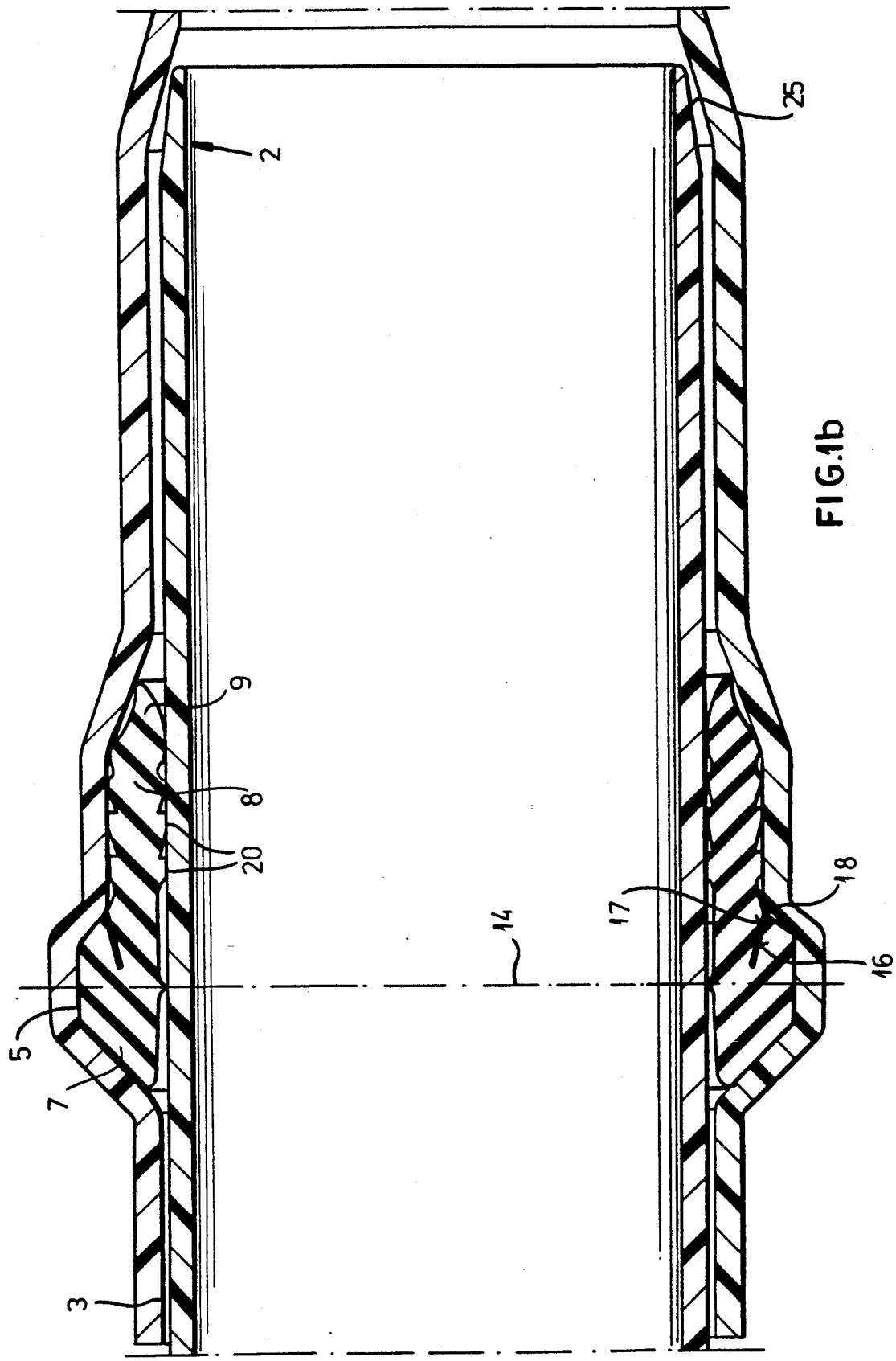
FIG. 1b is an axial sectional view corresponding to FIG. 1a after full insertion of the insert part.

The ring 7 is formed at its inner side with an annular circumferentially continuous compression rib 10 which is located along a ramp 12 at an inclined position 11, the ramp 12 and the rib 10 respectively being inclined to the cylindrical guide member 3. The ramp is an inclined surface running from the compression rib 10 to a flank 30 (FIG. 2) seated against a longer channel flank 31 defining with a shorter flank 32 of the channel 5 a trapezoidal seat for the ring body 33. When the insert part 2 presses with its beveled surface 25 against the compression rib 10, the ring 7 is pressed into the channel as is clearly visible from FIG. 1b. Thus the chamber 5 and the body 33 of the retaining ring have corresponding trapezoidal cross sections. The compression rib 10 of the trapezoidal cross section is offset in the direction A from the center point of the ring body. The center point is represented by the dot dash line 35 in FIG. 1a.

The flank 31 of the channel 5 is also longer than the corresponding flank 30 of the ring 7.

As all of the FIGS, of the drawing make clear, the retaining ring has a circumferentially continuous annular compression relieving groove 13 which is open in the direction of the arrow A, i.e. in a direction opposite the mouth of the sleeve which is represented at 34 in FIG. 1a. The compression-relieving groove 13 extends substantially to a region in which the compression rib 10 is provided and this cross-section region is shown by a radial line 14. The region inwardly of the compression-relieving groove 13 is formed as an extension of the sealing lip 8 to the compression rib 10. This should be understood to mean that, in this extension region, the lip 8 is free from steps or discontinuities.

If one refers to the line 14, one can see that the compression-relieving groove 13 terminates inward of this line in a arcuate floor 15. From this floor, the compression-relieving groove widens in a wedge shape cross-section in the direction of the arrow A. From FIG 1b, one can see that, when the insert part 2 is forced through the ring, the surfaces 16 and 17 of the compression relieving groove 13 press against one another. This can be insured with a predetermined compression or prestressing. In a preferred construction of the connection the compression-relieving groove 13 on the one hand and the extension V of the sealing lip 8 on the other should engage the wall of the sleeve in a stepless or flush manner. In other words at the inner edge 18 of the channel 5, the groove wall 16 is flush with the wall 36 of the chamber 16 and the wall 17 of the extension V lies in a stepless manner against the wall 16 and the wall 36.

The embodiment of FIGS. 3 and 4 has been found to be especially advantageous. Here the sealing lip 8 including the closure lip 9 is formed as a double lip with the lip segments or individual lip portions being shown by the reference characters a and b respectively. Thus, the lips 8a, 9a, and 8a, 9b are separated by a gap 19 which opens in the opposite direction of arrow A but extends in the opposite direction to the beginning of the compression-relieving groove 13. In both embodiments the sealing lip 8 and the closure lip 9 or the lips 8a, 9a and 8b, 9b can be provided with circumferentially continuous sealing ribs 20 which, as shown in FIG. 4 could have a sawtooth shape and can be provided with such flank angles that a self locking engagement of the insert piece 2 is insured.

For example, as can be seen from FIG. 4, the inlet side flank of the rib 20 may form an angle with a connection radius 21 as represented at 22 which is equal to or less than 45 degrees to bring about a self-locking engagement. The flank 37 which engages the shorter flank 32 can include a similar angle 22 with the radius 21. The compression rib 10 can include an angle 24 with the connector radius 23 which can cooperate with the bevel surface 25 and can be an angle greater than the angle of self locking so that at the regions of angle 22 self locking can occur while at the angle 24 self locking cannot occur thereby further reducing the insertion force.

I claim:

1. A pipe connection comprising:

a tubular insert member formed on one pipe to be connected to another pipe with the two pipes generally centered on a common axis;

a sleeve formed on the other pipe and generally coaxially receiving the insert member, the sleeve being formed with:

an outer tubular insertion guide forming a mouth initially receiving the tubular insert member of the one pipe, a channel-forming part axially inward of the tubular insertion guide and forming a radially inwardly open annular channel defined between a relatively long annular flank on an axial side of the channel proximal to the mouth and a relatively short annular flank on an axial side of the channel remote from the mouth, and a recess-forming part axially adjacent the channel-forming part and forming a radially inwardly open annular recess, and a tubular inner guide axially inward of the recess-forming part; and a retaining ring mounted in the sleeve and engageable against the sleeve and the member for retaining the member in the sleeve and sealing between the insert member and the sleeve, the retaining ring being formed with:

a ring body of trapezoidal cross section fitted into the channel, a sealing lip formed on the ring body and extending therefrom axially inward in an axially inward direction of insertion of the member into the sleeve, the sealing lip, prior to insertion of the member, being funnel shaped and converging axially inwardly, the sealing lip being deflected radially outward by the member upon insertion of the member into the sleeve to lie in the recess, a closure lip formed on the sealing lip and extending axially inward into the sleeve therefrom, the closure lip frustoconically widening axially inward away from the sealing lip prior to insertion of the member and engaging a wall of the recess, an annular compression rib projecting radially inwardly on the body and forming a termination between a ramp surface of the body inclined inwardly and axially at least with respect to the tubular insertion guide and the sealing lip, whereby, upon engagement of the member with the compression rib, the body is pressed into the channel, and the compression rib lies axially inward of an axial center of the body and the channel, and an annular compression-relieving groove formed in the body and opening axially inward therein away from the mouth and extending toward the compression rib but terminating axially inward of the rib, the compression-relieving groove having an arcuate groove floor lying axially between the flanks of the channel, and a pair of groove flanks diverging and extending axially inward from the floor and constructed and arranged to engage each other starting at where they join the floor in a stepless manner upon insertion of the member.

2. The pipe connection defined in claim 1 wherein the sleeve is formed unitarily with the other pipe of a plastic, the member is formed unitarily with the one pipe of a plastic, and the retaining ring is formed in one piece of an elastically compressible material.

3. The pipe connection defined in claim 1 wherein the sealing lip is of double-lip construction and formed with two mutually diverging lips separated by a gap between them prior to insertion of the member in the sleeve, the gap extending axially outward toward the mouth to a location generally at an axially inner end of the compression-relieving groove.

4. The pipe connection defined in claim 3 wherein the sleeve is formed unitarily with the other pipe of a plastic, the member is formed unitarily with the one pipe of a plastic, and the retaining ring is formed in one piece of an elastically compressible material.

* * * * *